(12) United States Patent
Yamazaki et al.

(10) Patent No.: US 10,205,160 B2
(45) Date of Patent: *Feb. 12, 2019

(54) GRAPHENE COMPOSITE OXIDE LAYERED ELECTRODE FOR LITHIUM-ION SECONDARY BATTERIES

(71) Applicant: SEMICONDUCTOR ENERGY LABORATORY CO., LTD., Atsugi-shi, Kanagawa-ken (JP)

(72) Inventors: Shunpei Yamazaki, Tokyo (JP); Tomoya Futamura, Kanagawa (JP); Tamae Moriwaka, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 598 days.

This patent is subject to a terminal disclaimer.

(21) Appl. No.: 14/725,724

(22) Filed: May 29, 2015

(65) Prior Publication Data
US 2015/0263343 A1 Sep. 17, 2015

Related U.S. Application Data

(63) Continuation of application No. 13/425,576, filed on Mar. 21, 2012, now Pat. No. 9,059,478.

(30) Foreign Application Priority Data

Mar. 25, 2011 (JP) .................................. 2011-068599

(51) Int. Cl.
*H01M 4/36* (2006.01)
*H01M 4/131* (2010.01)
(Continued)

(52) U.S. Cl.
CPC .......... *H01M 4/366* (2013.01); *H01M 4/131* (2013.01); *H01M 4/133* (2013.01); *H01M 4/136* (2013.01);
(Continued)

(58) Field of Classification Search
None
See application file for complete search history.

(56) References Cited

U.S. PATENT DOCUMENTS 5,910,382 A 6/1999 Goodenough et al.
6,391,493 B1 5/2002 Goodenough et al.
(Continued)

FOREIGN PATENT DOCUMENTS

CN 101916859 A 12/2010
CN 101964417 A 2/2011
(Continued)

OTHER PUBLICATIONS

Wang et al. Solid State Ionics 181 (2010) 1685-1689 A facile method of preparing mixed conducting LiFePO4/graphene composites for lithium-ion batteries (Year: 2010).*

(Continued)

*Primary Examiner* — Lucas J. O'Donnell
(74) *Attorney, Agent, or Firm* — Nixon Peabody LLP; Jeffrey L. Costellia

(57) ABSTRACT

To provide a lithium-ion secondary battery having higher discharge capacity and higher energy density and a manufacturing method thereof. The lithium-ion secondary battery includes a positive electrode, a negative electrode, and an electrolyte provided between the positive electrode and the negative electrode. The positive electrode includes a positive electrode current collector and a positive electrode active material layer provided over the positive electrode current collector. In the positive electrode active material layer, graphenes and lithium-containing composite oxides are alternately provided. The lithium-containing composite oxide is a flat single crystal particle in which the length in the b-axis direction is shorter than each of the lengths in the a-axis direction and the c-axis direction. Further, the lithium-containing composite oxide is provided over the positive (Continued)

electrode current collector so that the b-axis of the single crystal particle intersects with a surface of the positive electrode current collector.

5 Claims, 9 Drawing Sheets

(51) Int. Cl.
| | | |
|---|---|---|
| *H01M 4/485* | (2010.01) | |
| *H01M 4/58* | (2010.01) | |
| *H01M 4/62* | (2006.01) | |
| *H01M 10/0525* | (2010.01) | |
| *H01M 4/133* | (2010.01) | |
| *H01M 4/136* | (2010.01) | |
| *H01M 4/587* | (2010.01) | |
| *H01M 4/02* | (2006.01) | |

(52) U.S. Cl.
CPC .......... *H01M 4/485* (2013.01); *H01M 4/587* (2013.01); *H01M 4/5825* (2013.01); *H01M 4/62* (2013.01); *H01M 4/621* (2013.01); *H01M 10/0525* (2013.01); *H01M 2004/028* (2013.01); *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 6,514,640 B1 | 2/2003 | Armand et al. |
| 6,913,855 B2 | 7/2005 | Stoker et al. |
| 7,179,561 B2 | 2/2007 | Niu et al. |
| 7,718,314 B2 | 5/2010 | Komiyama et al. |
| 7,745,047 B2 | 6/2010 | Zhamu et al. |
| 7,842,432 B2 | 11/2010 | Niu et al. |
| 7,939,218 B2 | 5/2011 | Niu |
| 7,955,733 B2 | 6/2011 | Armand et al. |
| 7,960,058 B2 | 6/2011 | Goodenough et al. |
| 7,964,308 B2 | 6/2011 | Goodenough et al. |
| 7,972,728 B2 | 7/2011 | Goodenough et al. |
| 7,977,007 B2 | 7/2011 | Niu et al. |
| 7,977,013 B2 | 7/2011 | Niu et al. |
| 7,998,617 B2 | 8/2011 | Armand et al. |
| 8,053,075 B2 | 11/2011 | Schall et al. |
| 8,067,117 B2 | 11/2011 | Goodenough et al. |
| 8,097,362 B2 | 1/2012 | Isono |
| 8,133,616 B2 | 3/2012 | Exnar et al. |
| 8,142,750 B2 | 3/2012 | Sano et al. |
| 8,278,011 B2 | 10/2012 | Zhu et al. |
| 8,282,691 B2 | 10/2012 | Goodenough et al. |
| 8,658,316 B2 | 2/2014 | Kitagawa et al. |
| 8,663,847 B2 | 3/2014 | Kashiwa et al. |
| 8,673,497 B2 | 3/2014 | Hibst et al. |
| 8,697,287 B2 | 4/2014 | Salot et al. |
| 8,785,043 B2 | 7/2014 | Armand et al. |
| 8,795,898 B2 | 8/2014 | Sugiura et al. |
| 8,916,293 B2 | 12/2014 | Sugiura et al. |
| 9,362,562 B2 | 6/2016 | Armand et al. |
| 2003/0082454 A1 | 5/2003 | Armand et al. |
| 2004/0096743 A1 | 5/2004 | Okae et al. |
| 2005/0003274 A1 | 1/2005 | Armand et al. |
| 2005/0244321 A1 | 11/2005 | Armand et al. |
| 2007/0166618 A1 | 7/2007 | Armand et al. |
| 2007/0281215 A1 | 12/2007 | Armand et al. |
| 2008/0248382 A1 | 10/2008 | Sastry et al. |
| 2008/0254296 A1 | 10/2008 | Handa et al. |
| 2008/0268339 A1 | 10/2008 | Suzuki |
| 2009/0197174 A1 | 8/2009 | Levassbur et al. |
| 2010/0143798 A1 | 6/2010 | Zhamu et al. |
| 2010/0159325 A1 | 6/2010 | Sugiura et al. |
| 2010/0159326 A1 | 6/2010 | Sugiura et al. |
| 2010/0159329 A1 | 6/2010 | Sugiura et al. |
| 2010/0159333 A1 | 6/2010 | Sugiura et al. |
| 2010/0159366 A1* | 6/2010 | Shao-Horn ............ H01G 11/36 429/532 |
| 2010/0163790 A1 | 7/2010 | Ceder et al. |
| 2010/0173204 A1 | 7/2010 | Sugiura et al. |
| 2010/0176337 A1 | 7/2010 | Zhamu et al. |
| 2010/0202951 A1 | 8/2010 | Wu et al. |
| 2010/0227221 A1 | 9/2010 | Chang et al. |
| 2010/0233538 A1 | 9/2010 | Nesper et al. |
| 2010/0233546 A1 | 9/2010 | Nesper et al. |
| 2010/0248034 A1 | 9/2010 | Oki et al. |
| 2010/0279117 A1 | 11/2010 | Gu |
| 2010/0314589 A1 | 12/2010 | Armand et al. |
| 2010/0316909 A1 | 12/2010 | Armand et al. |
| 2010/0330421 A1 | 12/2010 | Cui et al. |
| 2011/0012067 A1 | 1/2011 | Kay |
| 2011/0017959 A1 | 1/2011 | Armand et al. |
| 2011/0020706 A1 | 1/2011 | Nesper |
| 2011/0031105 A1 | 2/2011 | Miyanaga |
| 2011/0039158 A1 | 2/2011 | Armand et al. |
| 2011/0111303 A1 | 5/2011 | Kung et al. |
| 2011/0121240 A1 | 5/2011 | Amine et al. |
| 2011/0159372 A1 | 6/2011 | Zhamu et al. |
| 2011/0195310 A1 | 8/2011 | Kawamoto et al. |
| 2011/0223482 A1 | 9/2011 | Fujii et al. |
| 2011/0229795 A1 | 9/2011 | Niu et al. |
| 2011/0274975 A1 | 11/2011 | Kashiwa et al. |
| 2011/0287316 A1 | 11/2011 | Lu et al. |
| 2012/0028122 A1 | 2/2012 | Kohmoto et al. |
| 2012/0045692 A1 | 2/2012 | Takemura et al. |
| 2012/0100402 A1 | 4/2012 | Nesper et al. |
| 2012/0177842 A1 | 7/2012 | Mikami et al. |
| 2012/0183839 A1 | 7/2012 | Yuasa et al. |
| 2012/0214068 A1 | 8/2012 | Dai et al. |
| 2012/0237426 A1 | 9/2012 | Futamura |
| 2012/0237822 A1 | 9/2012 | Futamura et al. |
| 2013/0045424 A1 | 2/2013 | Sugiura et al. |
| 2013/0047915 A1 | 2/2013 | Miwa et al. |
| 2014/0087258 A1 | 3/2014 | Kabe et al. |
| 2014/0308192 A1 | 10/2014 | Armand et al. |
| 2016/0254530 A1 | 9/2016 | Armand et al. |

FOREIGN PATENT DOCUMENTS

| | | |
|---|---|---|
| CN | 102064313 A | 5/2011 |
| CN | 102148371 A | 8/2011 |
| CN | 102315450 A | 1/2012 |
| EP | 1501137 A | 1/2005 |
| EP | 1755182 A | 2/2007 |
| EP | 1755183 A | 2/2007 |
| EP | 2228854 A | 9/2010 |
| EP | 2228855 A | 9/2010 |
| EP | 2282368 A | 2/2011 |
| EP | 2287946 A | 2/2011 |
| EP | 2357694 A | 8/2011 |
| EP | 2369660 A | 9/2011 |
| EP | 2369661 A | 9/2011 |
| EP | 2369663 A | 9/2011 |
| EP | 2369664 A | 9/2011 |
| EP | 2369665 A | 9/2011 |
| EP | 2369666 A | 9/2011 |
| EP | 2389662 A | 9/2011 |
| JP | 11-025983 A | 1/1999 |
| JP | 2001-167761 A | 6/2001 |
| JP | 2004-079276 A | 3/2004 |
| JP | 2006-252945 A | 9/2006 |
| JP | 2006-265751 A | 10/2006 |
| JP | 2007-103339 A | 4/2007 |
| JP | 2009-524567 | 7/2009 |
| JP | 2009-176721 A | 8/2009 |
| JP | 2010-056097 A | 3/2010 |
| JP | 2010-218821 A | 9/2010 |
| JP | 2010-219048 A | 9/2010 |
| JP | 2010-232091 A | 10/2010 |
| JP | 2010-232174 A | 10/2010 |
| JP | 2011-503804 | 1/2011 |
| JP | 2011-029184 A | 2/2011 |
| JP | 2011-054564 A | 3/2011 |
| JP | 2011-076820 A | 4/2011 |
| JP | 2011-517053 | 5/2011 |

(56) References Cited

FOREIGN PATENT DOCUMENTS

| | | |
|---|---|---|
| JP | 4767798 | 9/2011 |
| KR | 2006-0124978 A | 12/2006 |
| KR | 2007-0043802 A | 4/2007 |
| KR | 2010-0103428 A | 9/2010 |
| KR | 2010-0103429 A | 9/2010 |
| KR | 2011-0009637 A | 1/2011 |
| KR | 2011-0015371 A | 2/2011 |
| WO | WO-1997/040541 | 10/1997 |
| WO | WO-2006/027925 | 3/2006 |
| WO | WO-2006/062947 | 6/2006 |
| WO | WO-2007/061945 | 5/2007 |
| WO | WO-2008/077447 | 7/2008 |
| WO | WO-2009/061685 | 5/2009 |
| WO | WO-2009/127901 | 10/2009 |
| WO | WO-2009/144600 | 12/2009 |
| WO | WO-2010/074299 | 7/2010 |
| WO | WO-2010/082402 | 7/2010 |

OTHER PUBLICATIONS

Wang et al. Advanced Materials 2010 22 4944-4948 Mesoporous LiFePO 4 /C Nanocomposite Cathode Materials for High Power Lithium Ion Batteries with Superior Performance (Year: 2010).*

Preparation of nano-structured LiFePO4/graphene composites by co-precipitation method; Electrochemistry Communications 12 (2010) 10-13. (Year: 2010).*

Wang.H et al., "Nanocrystal Growth on Graphene with Various Degrees of Oxidation", J. Am. Chem. Soc. (Journal of the American Chemical Society), 2010, vol. 132, No. 10, pp. 3270-3271.

Kim.H et al., "Li4Ti5O12/reduced graphite oxide nano-hybrid material for high rate lithium-ion batteries", Electrochemistry Communications, 2010, vol. 12, pp. 1768-1771, Elsevier.

Chinese Office Action (Application No. 201280014987.1) Dated Jul. 1, 2015.

Kang.B et al., "Battery Materials for Ultrafast Charging and Discharging", Nature, Mar. 12, 2009, vol. 458, No. 7235, pp. 190-193.

Zhou.F et al., "The Li intercalation potential of LiMPO4 and LiMSiO4 olivines with M=Fe, Mn, Co, Ni", Electrochemistry Communications, Nov. 1, 2004, vol. 6, No. 11, pp. 1144-1148.

Liang.G et al., "Anisotropy in magnetic properties and electronic structure of single-crystal LiFePO4", Phys. Rev. B (Physical Review. B), 2008, vol. 77, pp. 064414-1-064414-12.

Dokko.K et al., "Electrochemical properties of LiFePO4 prepared via hydrothermal route", Journal of.Power Sources, Mar. 20, 2007, vol. 165, No. 2, pp. 656-659.

International Search Report (Application No. PCT/JP2012/001896) Dated Jun. 26, 2012.

Written Opinion (Application No. PCT/JP2012/001896) Dated Jun. 26, 2012.

Zhou.X et al., "Graphene modified LiFePO4 cathode materials for high power lithium ion batteries", J. Mater. Chem. (Journal of Materials Chemistry), 2011, vol. 21, pp. 3353-3358.

Su.F et al., "Flexible and planar graphene conductive additives for lithium-ion batteries", J. Mater. Chem.(Journal of Materials Chemistry), 2210, vol. 20, pp. 9644-9650.

Yu.G et al., "Solution-Processed Graphene/MnO2 Nanostructured Textiles for High-Performance Electrochemical Capacitors", Nano Letters, 2011, vol. 11, No. 7, pp. 2905-2911.

Kuwahara.A et al., "Hydrothermal synthesis of LiFePO4 with small particle size and its electrochemical properties", Journal of Electroceramics, 2010, vol. 24, pp. 69-75.

Yang.S et al., "Hydrothermal Synthesis of Lithium Iron Phosphate Cathodes", Electrochemistry Communications, 2001, vol. 3, No. 9, pp. 505-508.

Tannai.H et al., "Optimization of Hydrothermal Synthesis Process and Evaluation of LiFePO4 Cathode for Rechargable Lithium Batteries", The 48th Battery Symposium in Japan, Nov. 13, 2007, pp. 66-67.

* cited by examiner

GRAPHENE COMPOSITE OXIDE LAYERED ELECTRODE FOR LITHIUM-ION SECONDARY BATTERIES

TECHNICAL FIELD

The present invention relates to a lithium-ion secondary battery and a manufacturing method thereof.

BACKGROUND ART

In recent years, lithium-ion secondary batteries have been developed. Because of their high thermal stability, lithium-containing composite oxides having olivine structures, such as $LiFePO_4$, $LiMnPO_4$, $LiCoPO_4$, and $LiNiPO_4$, have been expected as positive electrode active materials of lithium-ion secondary batteries.

In order to increase the discharge capacity and the energy density of lithium-ion secondary batteries, attempts have been made to reduce the particle diameters and variation in particle size of active materials included in an active material layer that relates to intercalation and deintercalation of ions functioning as carriers (see Patent Document 1).

REFERENCE

[Patent Document 1] PCT International Publication No. 08/077447

DISCLOSURE OF INVENTION

However, lithium-containing composite oxides included in a lithium-ion secondary battery have high resistance, so that there has been a limit on the increase of the discharge capacity and the energy density.

In view of the above problems, an object of one embodiment of the present invention is to provide a lithium-ion secondary battery having higher discharge capacity and higher energy density and a method for manufacturing such a lithium-ion secondary battery.

One embodiment of the present invention is a lithium-ion secondary battery including a positive electrode, a negative electrode, and an electrolyte provided between the positive electrode and the negative electrode. The positive electrode includes a positive electrode current collector and a positive electrode active material layer provided over the positive electrode current collector. The positive electrode active material layer includes graphenes and lithium-containing composite oxides. Specifically, in the positive electrode active material layer, the plurality of lithium-containing composite oxides is provided between the different graphenes. The lithium-containing composite oxide is expressed by a general formula $LiMPO_4$ (M is one or more of Fe(II), Mn(II), Co(II), and Ni(II)). The lithium-containing composite oxide is a flat single crystal particle in which the length in the b-axis direction is shorter than each of the lengths in the a-axis direction and the c-axis direction. The length in the b-axis direction is typically longer than or equal to 5 nm and shorter than or equal to 50 nm. Further, the lithium-containing composite oxide is provided over the positive electrode current collector so that the b-axis of the single crystal particle intersects with a surface of the positive electrode current collector. Typically, the b-axis of the single crystal particle intersects with the surface of the positive electrode current collector at any angle from 60° to 90°.

The lithium-containing composite oxides each have an olivine structure. The lithium-containing composite oxides each have an orthorhombic crystal structure and belong to a space group Pnma (62). In each of the single crystal particles of the lithium-containing composite oxides, the lengths in the a-axis direction and the c-axis direction are each longer than the length in the b-axis direction. The lithium-containing composite oxides may be stacked between the different graphenes.

The graphene refers to a sheet of one to ten atomic layers of carbon molecules in which covalently-bonded carbon atoms form a six-membered ring which is a unit of repetition.

In the positive electrode of the lithium-ion secondary battery according to one embodiment of the present invention, the positive electrode active material layer includes an olivine-type lithium-containing composite oxide that is a flat single crystal particle in which the length in the b-axis direction is shorter than each of the lengths in the a-axis direction and the c-axis direction. Further, the b-axis intersects with the surface of the positive electrode current collector. Therefore, lithium ions are easily diffused between the current collector and the electrolyte. The use of the graphene for a conduction auxiliary agent allows an increase in proportion of a positive electrode active material in the positive electrode active material layer and a reduction in resistance of the positive electrode active material layer. When the positive electrode includes the positive electrode active material layer having such a structure, the lithium-ion secondary battery can have reduced internal resistance and higher power and can be charged and discharged at high speed. Moreover, the lithium-ion secondary battery can have discharge capacity as high as theoretical discharge capacity.

According to one embodiment of the present invention, the discharge capacity of a lithium-ion secondary battery can be increased, and the lithium-ion secondary battery can have higher power and can be charged and discharged at high speed. Further, it is possible to manufacture a lithium-ion secondary battery which has high discharge capacity and high power and can be charged and discharged at high speed.

BEST MODE FOR CARRYING OUT THE INVENTION

Figure 1A:
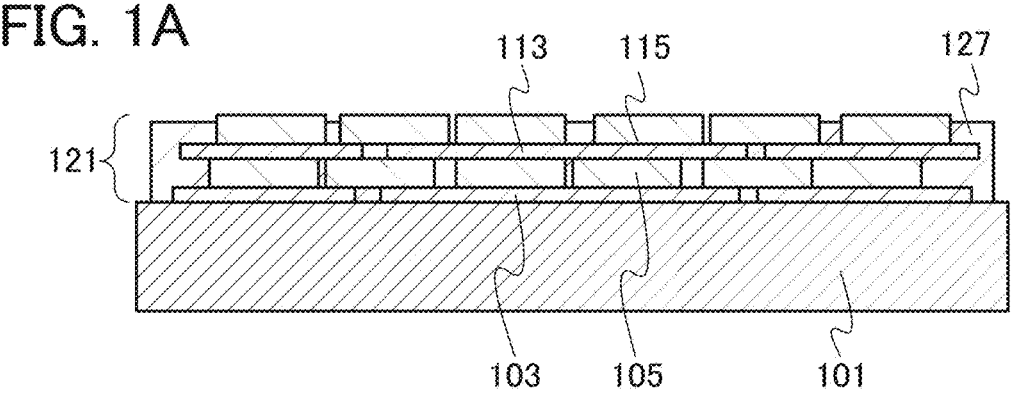
FIGS. 1A to 1C illustrate positive electrodes of lithium-ion secondary batteries.

Examples of embodiments of the present invention will be described with reference to the drawings. Note that the present invention is not limited to the following description, and it will be easily understood by those skilled in the art that various changes and modifications can be made without departing from the spirit and the scope of the present invention. Thus, the present invention should not be construed as being limited to the following description of the embodiments. In description with reference to the drawings, in some cases, common reference numerals are used to denote the same portions in different drawings. Further, in some cases, the same hatching patterns are applied to similar portions, and the similar portions are not necessarily designated by reference numerals.

Embodiment 1

In this embodiment, a positive electrode of a lithium-ion secondary battery according to one embodiment of the present invention and a manufacturing method thereof will be described with reference to FIGS. 1A to 1C, FIG. 2, and FIGS. 3A to 3E.

Figure 1B:
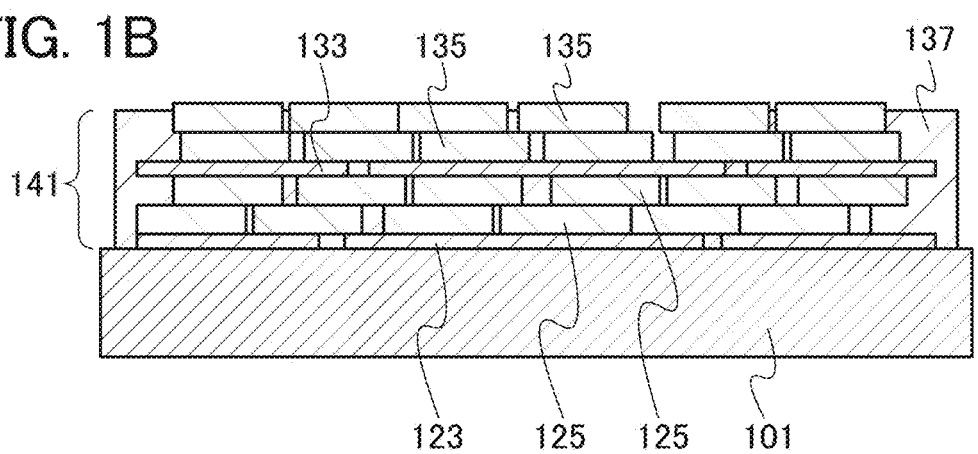

FIGS. 1A and 1B are each a cross-sectional view of a positive electrode of a lithium-ion secondary battery.

As illustrated in FIG. 1A, graphenes 103 serving as a conduction auxiliary agent are provided over a positive electrode current collector 101. Lithium-containing composite oxides 105 which are a positive electrode active material are provided over the graphenes 103. Graphenes 113 serving as a conduction auxiliary agent are provided over the lithium-containing composite oxide 105. Lithium-containing composite oxides 115 which are a positive electrode active material are provided over the graphenes 113. That is to say, the graphenes and the lithium-containing composite oxides are alternately stacked. Gaps between the graphenes 103, between the graphenes 113, between the lithium-containing composite oxides 105, and between the lithium-containing composite oxides 115 are filled with a binder 127. Note that the binder 127 is porous and fibrous and includes gaps; thus, when an electrolyte is a liquid electrolyte in the lithium-ion secondary battery, the gaps between the graphenes 103 and between the lithium-containing composite oxides 105 which are the positive electrode active material are filled with the electrolyte.

Note that an electrolyte in this specification means the one which includes a material in which lithium ions stably exist and with which lithium ions functioning as carrier ions can be transferred. The electrolyte includes in its category an electrolyte solution obtained by dissolving, in a solvent, a material (solute) in which lithium ions stably exist, and a solid electrolyte including a material (solute) in which lithium ions stably exist, for example.

Note that the positive electrode active material refers to a material that relates to intercalation and deintercalation of ions which function as carriers. Thus, the lithium-containing composite oxide is a positive electrode active material, whereas the graphene, the binder, a solvent, and the like are not positive electrode active materials.

As the positive electrode current collector 101, a material having high conductivity such as platinum, aluminum, copper, titanium, or stainless steel can be used. The positive electrode current collector 101 can have a foil shape, a plate shape, a net shape, or the like as appropriate.

The graphene 103 refers to a sheet of approximately one to ten atomic layers of carbon molecules in which covalently-bonded carbon atoms form a six-membered ring which is a unit of repetition. Thus, the graphene 103 is a pseudo two-dimensional sheet having a honeycomb structure. In the graphene 103, carbon atoms have $sp^2$ bonds.

Having significantly high carrier mobility at room temperature, the graphene 103 can be used for a conduction auxiliary agent in the positive electrode active material layer. Since the graphene 103 is a sheet of approximately one to ten atomic layers of carbon molecules here, the volume thereof is extremely low; thus, the proportion of the conduction auxiliary agent included in a positive electrode active material layer 121 can be reduced, resulting in an increase in proportion of an active material in the positive electrode active material layer.

The desired thickness of the positive electrode active material layer 121 is determined in the range of 20 μm to 100 μm. It is preferable to adjust the thickness of the positive electrode active material layer 121 as appropriate so that a crack and separation are not caused.

The lithium-containing composite oxide 105 included in the positive electrode active material layer 121 is a single crystal particle having an olivine structure. Typical examples of the olivine-type lithium-containing composite oxide (the general formula thereof is $LiMPO_4$ (M is one or more of Fe(II), Mn(II), Co(II), and Ni(II))) are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Figure 1C:
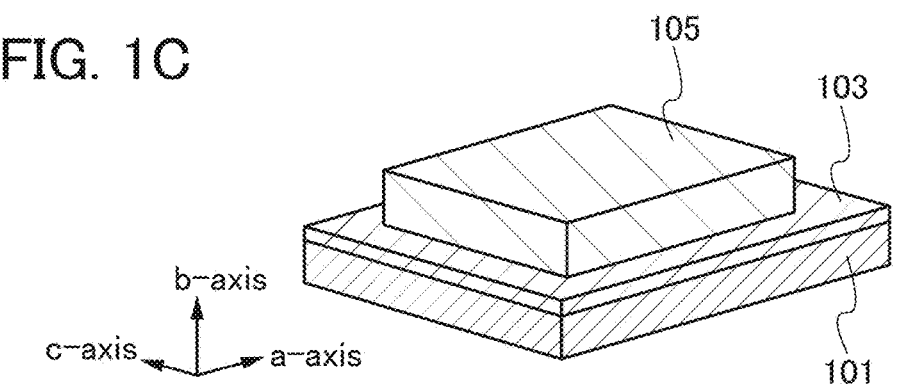

Here, the shape of the lithium-containing composite oxide used in this embodiment will be described with reference to FIG. 1C.

The lithium-containing composite oxide 105 has an orthorhombic crystal structure and belongs to a space group Pnma (62). The lithium-containing composite oxide 105 is a flat crystal particle in which the length in the b-axis direction is shorter than each of the lengths in the a-axis direction and the c-axis direction. Since lithium ions are diffused in the b-axis direction in an olivine structure, it is preferable to set the length in the b-axis direction to longer than or equal to 5 nm and shorter than or equal to 50 nm, preferably longer than or equal to 5 nm and shorter than or equal to 20 nm so that lithium ions are easily diffused. Further, it is preferable to set the ratio of the lengths in the a-axis direction and the c-axis direction to greater than or equal to 0.5 and less than or equal to 1.5, preferably greater than or equal to 0.8 and less than or equal to 1.2, i.e., the b-plane having a square shape or substantially square shape is preferable, because the lithium-containing composite oxides 105 can be arranged densely over the positive electrode current collector 101.

As for the lithium-containing composite oxide, one or more of a side in the a-axis direction, a side in the c-axis direction, and a plane including the side in the a-axis direction and the side in the c-axis direction, i.e., the b-plane are in contact with the graphene 103, and the b-axis of the single crystal particle intersects with a surface of the positive electrode current collector 101. The b-axis of the lithium-containing composite oxide intersects with the surface of the positive electrode current collector 101 typically at any angle from 60° to 90°. Since lithium ions are diffused in the b-axis direction in an olivine structure, it is preferable that the b-axis intersect with the surface of the positive electrode current collector 101 at any angle from 60° to 90° to diffuse a larger number of lithium ions. Note that the term "the b-axis intersects with the surface of the positive electrode current collector 101" means that the b-axis and the surface of the positive electrode current collector 101 have an intersection point. In contrast, the term "the b-axis does not intersect with the surface of the positive electrode current collector 101" means that the b-axis is in parallel to the surface of the positive electrode current collector 101.

Note that it can be judged using more than one of a scanning electron microscope (SEM), a scanning transmission electron microscope (STEM), a transmission electron microscope (TEM), and X-ray diffraction (XRD) that the lithium-containing composite oxide 105 is a flat crystal in which the length of the side in the b-axis direction is shorter than each of the lengths of the sides in the a-axis direction and the c-axis direction. For example, it can be judged by X-ray diffraction (XRD) measurement that the b-axis of the single crystal particle of the lithium-containing composite oxide 105 intersects with the surface of the positive electrode current collector 101. Further, the lithium-containing composite oxide 105 is judged as a single crystal particle because the contrast of a dark-field image observed with a transmission electron microscope (TEM) is uniform and thus grain boundaries are not seen in the dark-field image.

Figure 2:
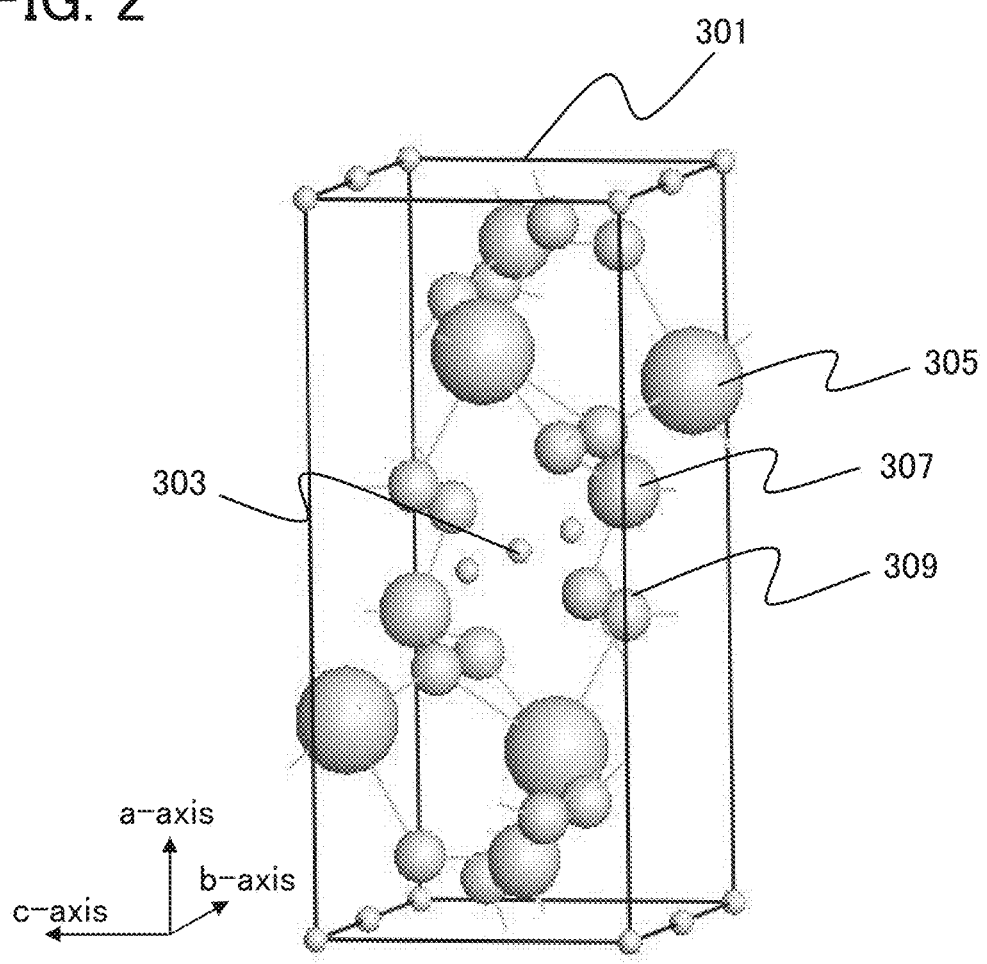
FIG. 2 illustrates a crystal structure of olivine-type $LiFePO_4$.

Here, description is given of an olivine structure. FIG. 2 illustrates a unit cell 301 of lithium iron phosphate (LiFePO$_4$) that is an example of an olivine-type lithium-containing composite oxide. An olivine-type lithium iron phosphate has an orthorhombic crystal structure and includes four formula units of lithium iron phosphate (LiFePO$_4$) within a unit cell. The basic framework of the olivine structure is a hexagonal closest packed structure of oxide ions, in which lithium, iron, and phosphorus are located in gaps of the closest packed structure.

Further, the olivine-type lithium iron phosphate (LiFePO$_4$) has a tetrahedral site and two kinds of octahedral sites. The tetrahedral site has four oxygen atoms in the vertices. The octahedral sites have six oxygen atoms in the vertices. Phosphorus 307 is located at the center of the tetrahedral site, and lithium 303 or iron 305 is located at the center of the octahedral site. The octahedral site with the lithium 303 located at the center is referred to as an M1 site, and the octahedral site with the iron 305 located at the center is referred to as an M2 site. The M1 site is disposed one-dimensionally in the b-axis direction. In other words, the lithium 303 is disposed one-dimensionally in the <010> direction. Note that for sake of simplicity, the bonds between the lithium 303 and other ions or atoms are not shown by lines.

The irons 305 of neighboring M2 sites are bonded in a zigzag manner with oxygen 309 interposed therebetween. The oxygen 309 bonded between the irons 305 of the neighboring M2 sites is also bonded to the phosphorus 307 of the tetrahedral site. Thus, the bonds of iron-oxygen-phosphorus are serially linked.

Note that the olivine-type lithium iron phosphate may be distorted. Furthermore, regarding the lithium iron phosphate, the composition ratio of lithium, iron, phosphorus, and oxygen is not limited to 1:1:1:4. Also, as the transition metal (M) of a lithium transition metal phosphate (LiMPO$_4$), a transition metal which has a larger ionic radius than a lithium ion, such as manganese, cobalt, or nickel, may be used.

When lithium is deintercalated from the olivine-type lithium iron phosphate in FIG. 2, iron phosphate is left, and this iron phosphate has a stable structure. Thus, intercalation and deintercalation of all lithium ions are possible. Further, the olivine-type lithium iron phosphate has thermal stability. In the olivine-type lithium iron phosphate, lithium ions are unidimensionally arranged in the b-axis direction and diffused in the b-axis direction. For this reason, when the length of the side in the b-axis direction of the single crystal particle is short, the lithium ions can be easily diffused.

In the positive electrode according to this embodiment, the positive electrode active material layer includes an olivine-type lithium-containing composite oxide which is a flat single crystal particle whose length in the b-axis direction is shorter than each of the lengths in the a-axis direction and the c-axis direction. Further, one or more of the side in the a-axis direction, the side in the c-axis direction, and a plane including the side in the a-axis direction and the side in the c-axis direction, i.e., the b-plane are in contact with graphene having high conductivity, and the b-axis whose direction is the direction of diffusion of lithium ions in the olivine structure intersects with the surface of the positive electrode current collector. Therefore, a larger number of lithium ions can be diffused between the current collector and an electrolyte.

The use of graphene for the conduction auxiliary agent allows a reduction in proportion of the conduction auxiliary agent in the positive electrode active material layer and a reduction in resistance of the positive electrode active material layer. Further, film-like graphene which is the conduction auxiliary agent and the lithium-containing composite oxides are alternately stacked and the lithium-containing composite oxides each have a flat shape; thus, it is possible to increase the fill rate of the lithium-containing composite oxides in the positive electrode active material layer. That is to say, the proportion of the positive electrode active material in the positive electrode active material layer can be increased and the resistance of the positive electrode active material layer can be reduced. Accordingly, when the positive electrode active material layer described in this embodiment is used for the positive electrode, the lithium-ion secondary battery can have reduced internal resistance and higher power and can be charged and discharged at high speed. Moreover, the lithium-ion secondary battery can have discharge capacity as high as theoretical discharge capacity.

As illustrated in FIG. 1B, a plurality of lithium-containing composite oxides may be stacked in a positive electrode active material layer 141. Specifically, graphenes 123 are provided over the positive electrode current collector 101, and a plurality of lithium-containing composite oxides 125 is stacked over the graphenes 123. In addition, graphenes 133 are provided over the lithium-containing composite oxides 125, and a plurality of lithium-containing composite oxides 135 are stacked over the graphene 133. The use of the positive electrode in FIG. 1B leads to a further increase in discharge capacity of the lithium-ion secondary battery as compared with the case of using the positive electrode in FIG. 1A.

Note that in FIGS. 1A and 1B, graphenes may be provided over surfaces of the lithium-containing composite oxides 115 and 135. The graphenes 103 and 123 are not necessarily provided over the positive electrode current collector 101, and the lithium-containing composite oxides 105 and 125 may be in contact with the positive electrode current collector 101.

Next, a method for forming the positive electrode of the lithium-ion secondary battery illustrated in FIG. 1A will be described with reference to FIGS. 3A to 3E.

Figure 3A:
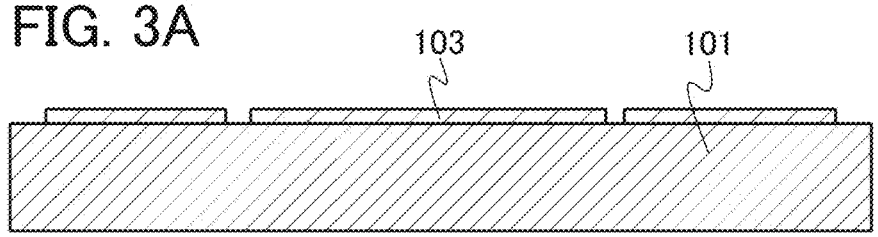
FIGS. 3A to 3E illustrate a method for forming a positive electrode of a lithium-ion secondary battery.

As illustrated in FIG. 3A, the graphenes 103 are provided as the conduction auxiliary agent over the positive electrode current collector 101. The graphene 103 can be formed by epitaxial growth on foil or a film of a transition metal, a coating method, a chemical separation method, or the like.

A process of epitaxial growth on foil or a film of a transition metal is as follows. Foil of a transition metal serving as a catalyst, such as nickel or iron, is formed over a substrate, the substrate is placed in a chamber and heated to 600° C. to 1100° C., inclusive, and a gas containing hydrocarbon such as methane or ethane is introduced into the chamber, so that graphene is formed over the substrate. Then, the foil of the transition metal is etched with an acid solution or the like to obtain the graphene. Note that instead of the substrate provided with the foil of the transition metal, a film of a transition metal may be used.

A coating method is as follows. A sulfuric acid solution of potassium permanganate, oxygenated water, or the like is mixed into single crystal graphite powder to cause oxidation reaction; thus, a graphene oxide aqueous solution is formed. Then, the graphene oxide aqueous solution is applied onto an appropriate substrate provided with a separation layer and dried. As the separation layer, a metal film which has a thickness from 1 nm to 100 nm and is soluble in an acid solution may be used. Then, graphene oxide is reduced by high-temperature heating in vacuum, addition of a reducing agent such as hydrazine, or the like, so that graphene is formed. After that, the separation layer is etched with an acid solution or the like, whereby graphene is obtained.

In the case of using a reducing agent in the manufacturing method, reduction reaction proceeds from a surface; therefore, the reduction reaction can be terminated at an appropriate depth by controlling reaction time. In this state, reduced graphene is obtained at the surface, while graphene oxide remains in an unreacted portion. Since graphene oxide can be dissolved in water, when the substrate is soaked in water, graphene insoluble in water can be obtained. The graphene oxide dissolved in water can be collected and applied onto another substrate.

A chemical separation method is a method in which graphene is chemically separated from graphite. Typically, graphite is placed in a polar solvent such as chloroform, N,N-dimethylformamide (DMF), or N-methylpyrrolidone (NMP) and bonds between layers in the graphite are broken by ultrasonic vibration, so that graphene can be obtained.

Figure 3B:
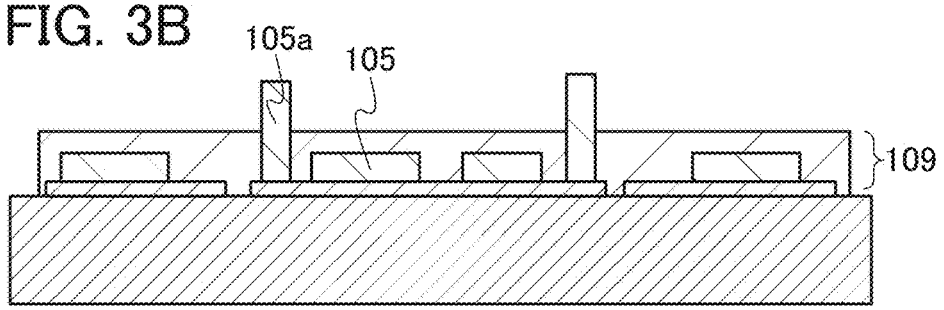

Next, as illustrated in FIG. 3B, slurry 109 including the lithium-containing composite oxides 105 is applied to the positive electrode current collector 101 and the graphenes 103. Then, it is preferable to make the thickness of the slurry 109 including the lithium-containing composite oxides 105 uniform or substantially uniform with a squeegee, a blade, or the like. Further, a solvent of the slurry 109 may be dried to increase the viscosity of the slurry 109. In this step, as illustrated in FIG. 3B, the lithium-containing composite oxides 105 are applied randomly to the positive electrode current collector 101 or the graphenes 103; thus, the a-axis, the b-axis, and the c-axis of the lithium-containing composite oxides 105 intersect with the surface of the positive electrode current collector 101. The lithium-containing composite oxide 105 is a flat single crystal particle in which the length in the b-axis direction is shorter than each of the lengths in the a-axis direction and the c-axis direction. Therefore, when the lithium-containing composite oxides 105 are dispersed over the positive electrode current collector 101 so that the a-axes or the c-axes of the lithium-containing composite oxides 105 intersect with the surface of the positive electrode current collector 101 or the graphene 103, i.e., so that the a-planes or the c-planes of the lithium-containing composite oxides 105 are in contact with the positive electrode current collector 101 or the graphene 103, the lithium-containing composite oxides lie so that the height thereof is high as shown by a lithium-containing composite oxide 105a.

The slurry 109 including the lithium-containing composite oxides further includes a binder, the solvent, and the like.

A solid phase method, a hydrothermal method, a spray pyrolysis method, or the like can be used as appropriate for forming the lithium-containing composite oxides. Note that a hydrothermal method is preferably employed for manufacturing flat single crystal particles which have small particle diameters and less variation in particle size and in each of which the length in the b-axis direction is shorter than each of the lengths in the a-axis direction and the c-axis direction.

As the binder, polysaccharides such as starch, carboxymethyl cellulose, hydroxypropyl cellulose, regenerated cellulose, and diacetyl cellulose; vinyl polymers such as polyvinyl chloride, polyethylene, polypropylene, polyvinyl alcohol, polyvinyl pyrrolidone, polytetrafluoroethylene, polyvinylide fluoride, ethylene-propylene-diene monomer (EPDM) rubber, sulfonated EPDM rubber, styrene-butadiene rubber, butadiene rubber, and fluorine rubber; polyether such as polyethylene oxide; and the like can be given.

Note that a solvent may be used as appropriate to disperse or dissolve the lithium-containing composite oxides and the binder in the slurry.

Lithium-containing composite oxides with small particle diameters are likely to agglomerate and difficult to disperse uniformly in the slurry. For this reason, a dispersant and a disperse medium are preferably used as appropriate to disperse the lithium-containing composite oxides uniformly in the slurry.

As the dispersant, a high-molecular dispersant, a surfactant dispersant (low-molecular dispersant), an inorganic dispersant, and the like are given. As the disperse medium, alcohol, water, and the like are given. Note that the dispersant and the disperse medium may be selected as appropriate depending on the lithium-containing composite oxide.

Next, physical pressure is exerted on the slurry 109 including the lithium-containing composite oxides 105. As a method for exerting physical pressure on the slurry 109 including the lithium-containing composite oxides 105, a method in which a roller, a squeegee, a blade, or the like is moved on the slurry 109 including the lithium-containing composite oxides 105 is given. Alternatively, ultrasonic vibration may be transmitted to the slurry including the lithium-containing composite oxides, instead of exerting physical pressure on the slurry. Consequently, in the slurry 109 including the lithium-containing composite oxides 105, the lithium-containing composite oxide 105 whose a-axis or c-axis intersects with the surface of the positive electrode current collector 101, i.e., the lithium-containing composite oxide 105a whose a-plane or c-plane is in contact with the graphene 103 falls down; thus, the lithium-containing composite oxide 105 can be in the state where the b-axis thereof intersects with the surface of the positive electrode current collector 101. In addition, one or more of the side in the a-axis direction, the side in the c-axis direction, and the b-plane of the lithium-containing composite oxide 105 can be in contact with the graphene 103. In other words, the area of regions of the graphenes 103 which are in contact with the lithium-containing composite oxides 105 can be increased.

Figure 3C:
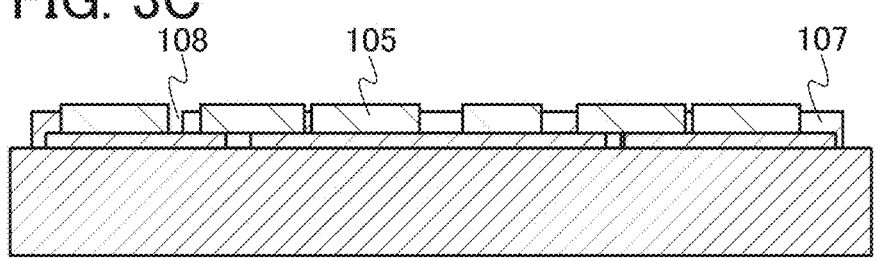

Then, the slurry 109 including the lithium-containing composite oxides 105 is heated to remove the solvent and to fix the lithium-containing composite oxides 105 with a binder 107 (see FIG. 3C). The binder becomes porous and fibrous through the heating and includes gaps 108, so that the lithium-containing composite oxides are exposed in the gaps.

Alternatively, the positive electrode current collector 101 over which the graphenes 103 are formed is soaked in the slurry 109 including the lithium-containing composite oxides 105 and then is gradually lifted. After that, the slurry 109 is heated to remove the solvent and to fix the lithium-containing composite oxides 105 with the binder 107. Consequently, the lithium-containing composite oxides 105 can be in the state where the b-axes thereof intersect with the surface of the positive electrode current collector 101 as illustrated in FIG. 3C. In that case, the positive electrode current collector 101 is gradually lifted after the surface tension between the slurry 109 and the positive electrode current collector 101 or the graphene 103 is controlled so that the meniscus of the slurry 109 is concave. Capillary action at end portions of the meniscus enables the state where the b-axes of the lithium-containing composite oxides 105 intersect with the surface of the positive electrode current collector 101 as illustrated in FIG. 3C.

Figure 3D:
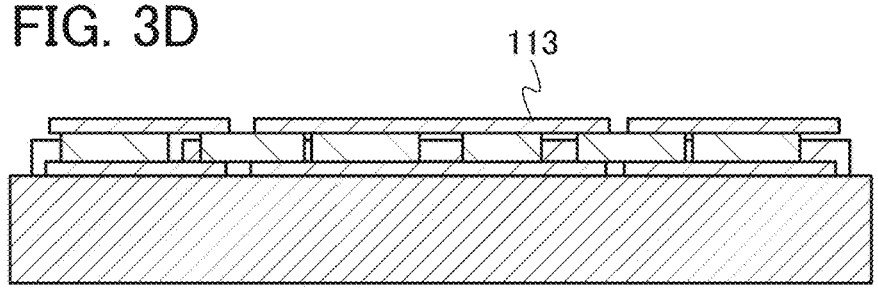

Next, as illustrated in FIG. 3D, the graphenes 113 are formed over the lithium-containing composite oxides 105 in a manner similar to that in FIG. 3A.

Figure 3E:
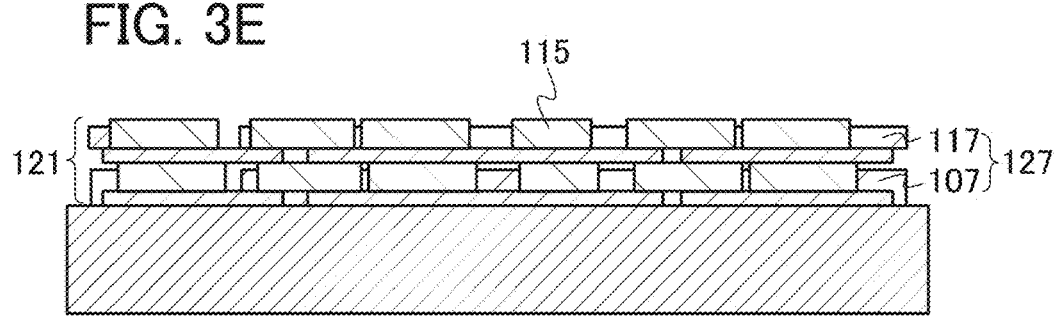

Then, by performing the steps in FIGS. 3B and 3C, the lithium-containing composite oxides 115 and a binder 117 are formed over the graphenes 113 as illustrated in FIG. 3E.

Through the above steps, the positive electrode of the lithium-ion secondary battery, in which the positive electrode active material layer 121 where the lithium-containing composite oxides 105 and 115 and the graphenes 103 and 113 are alternately stacked is provided over the positive electrode current collector 101, can be manufactured. Note that in the positive electrode active material layer 121, the binders 107 and 117 are collectively referred to as the binder 127.

Although FIGS. 3A to 3E illustrate the manufacturing method of a positive electrode of a lithium-ion secondary battery, in which one layer of lithium-containing composite oxides is provided between the graphenes 103 and 113 in FIG. 1A, when a plurality of layers of lithium-containing composite oxides are provided between graphenes, the positive electrode active material layer 141 in which the lithium-containing composite oxides 125 are stacked between the graphenes 123 and 133 as illustrated in FIG. 1B can be manufactured.

In the positive electrode according to this embodiment, the positive electrode active material layer includes an olivine-type lithium-containing composite oxide which is a flat single crystal particle whose length in the b-axis direction is shorter than each of the lengths in the a-axis direction and the c-axis direction. Further, one or more of the side in the a-axis direction, the side in the c-axis direction, and a plane including the side in the a-axis and the side in the c-axis, i.e., the b-plane are in contact with the graphene, and the b-axis whose direction is the direction of diffusion of lithium ions intersects with the surface of the positive electrode current collector. Therefore, a larger number of lithium ions can be diffused between the current collector and an electrolyte. Further, the use of graphene for the conduction auxiliary agent allows a reduction in proportion of the conduction auxiliary agent in the positive electrode active material layer and a reduction in resistance of the positive electrode active material layer. That is to say, the proportion of the positive electrode active material in the positive electrode active material layer can be increased and the resistance of the positive electrode active material layer can be reduced. Accordingly, when the positive electrode described in this embodiment is used for the lithium-ion secondary battery, the lithium-ion secondary battery can have reduced internal resistance and higher power and can be charged and discharged at high speed. Moreover, the lithium-ion secondary battery can have discharge capacity as high as theoretical discharge capacity.

Embodiment 2

In this embodiment, a method for forming a positive electrode including a positive electrode current collector and a positive electrode active material layer in which gaps are filled with a solid electrolyte over the positive current collector will be described.

In this embodiment, in the positive electrode active material layer described in Embodiment 1, the binder includes a solute of an electrolyte of a lithium-ion secondary battery.

Figure 4:
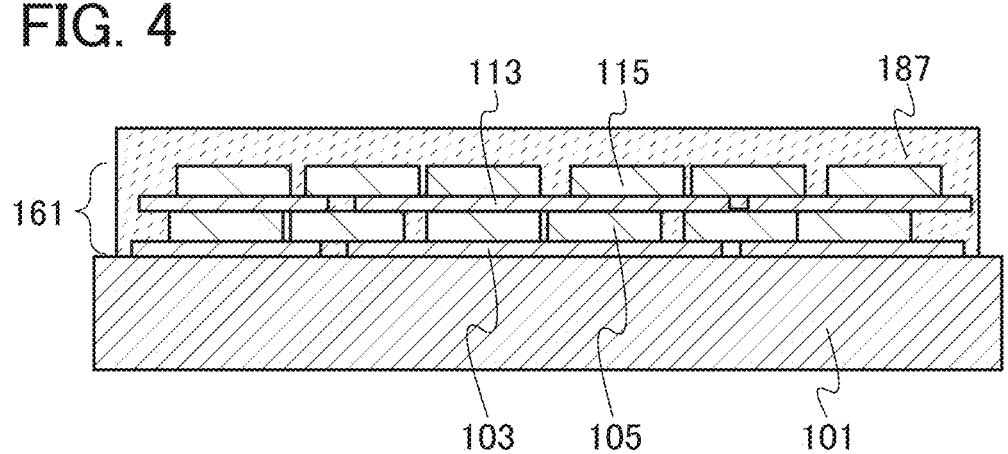
FIG. 4 illustrates a positive electrode and an electrolyte of a lithium-ion secondary battery.

FIG. 4 illustrates the positive electrode according to this embodiment.

As illustrated in FIG. 4, the graphenes 103 and the lithium-containing composite oxides 105 are stacked in this order over the positive electrode current collector 101. Further, the graphenes 113 are provided over the lithium-containing composite oxides 105, and the lithium-containing composite oxides 115 are stacked over the graphenes 113. Furthermore, a binder 187 including a solute of an electrolyte and serving as a solid electrolyte of a lithium-ion secondary battery is provided in gaps between the graphenes 103, between the graphenes 113, between the lithium-containing composite oxides 105, and between the lithium-containing composite oxides 115. A region where the graphenes 103 and 113 and the lithium-containing composite oxides 105 and 115 are stacked functions as a positive electrode active material layer 161.

As a solute of the electrolyte, a material in which lithium ions that are carrier ions can transfer and stably exist is used. Typical examples of the solute of the electrolyte include lithium salts such as $LiClO_4$, $LiAsF_6$, $LiBF_4$, $LiPF_6$, and $Li(C_2F_5SO_2)_2N$.

Note that a solvent may be used as appropriate to disperse or dissolve the solute of the electrolyte in slurry.

Next, methods for forming the positive electrode and the electrolyte which are illustrated in FIG. 4 will be described with reference to FIGS. 5A to 5E.

In a manner similar to that in Embodiment 1, slurry 149 including the solute of the electrolyte as well as the lithium-containing composite oxides 105 and the binder is applied to the graphenes 103 formed over the positive electrode current collector 101. Then, the thickness of the slurry 149 may be made uniform and a solvent of the slurry 149 may be dried.

Figure 5A:
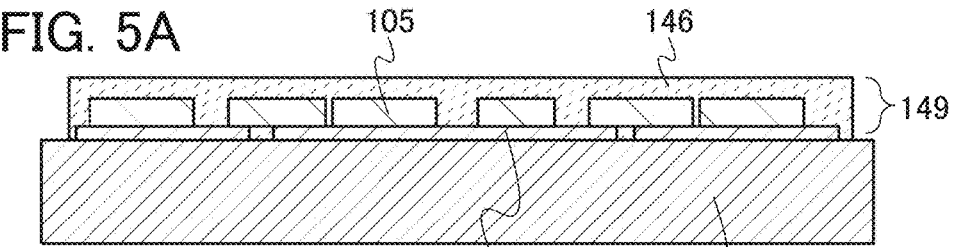
FIGS. 5A to 5E illustrate a method for manufacturing a lithium-ion secondary battery.

Then, in a manner similar to that in Embodiment 1, physical pressure is exerted on the slurry 149 including the lithium-containing composite oxides 105. Alternatively, ultrasonic vibration may be transmitted to the slurry 149 including the lithium-containing composite oxides 105. Still alternatively, after being soaked in the slurry 149 including the lithium-containing composite oxides 105, the positive electrode current collector 101 over which the graphenes 103 are formed may be gradually lifted. Consequently, the lithium-containing composite oxides 105 can be in the state where the b-axes thereof intersect with the surface of the positive electrode current collector 101 as illustrated in FIG. 5A. In addition, one or more of the side in the a-axis direction, the side in the c-axis direction, and the b-plane of the lithium-containing composite oxide 105 can be in contact with the graphene 103.

Figure 5B:
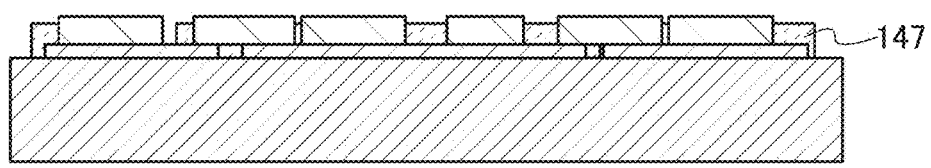

Then, in a manner similar to that in Embodiment 1, the slurry 149 including the lithium-containing composite oxides 105 is heated to remove the solvent and to fix the lithium-containing composite oxides 105 with a binder 147 including the electrolyte (see FIG. 5B).

Figure 5C:
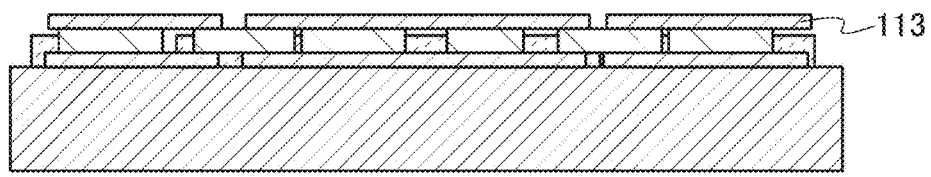

Next, as illustrated in FIG. 5C, the graphenes 113 are formed over the lithium-containing composite oxides 105 in a manner similar to that in Embodiment 1.

Figure 5D:
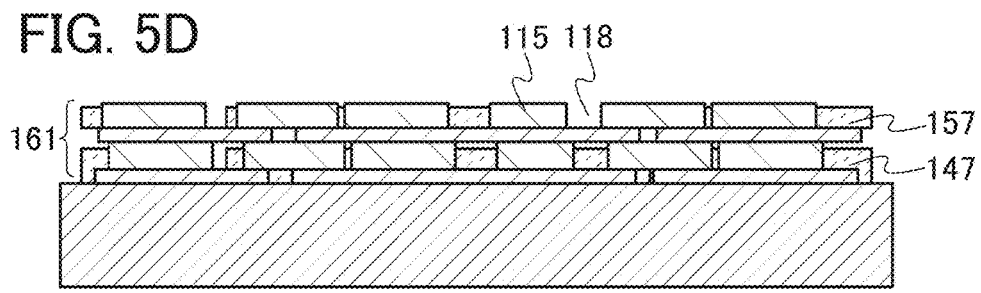

Then, by performing the steps in FIGS. 5A and 5B, the lithium-containing composite oxides 115 and a binder 157 are formed over the graphenes 113 as illustrated in FIG. 5D.

By heat treatment, gaps 118 are formed in the binder 157; thus, the lithium-containing composite oxides 115 are exposed in the gaps 118.

Through the above steps, the positive electrode active material layer 161 where the lithium-containing composite oxides 105 and 115 and the graphenes 103 and 113 are alternately stacked can be provided over the positive electrode current collector 101.

Although FIGS. 5A to 5E illustrate the manufacturing method of the positive electrode in which one layer of lithium-containing composite oxides is provided between the graphenes 103 and 113, a plurality of layers of lithium-containing composite oxides may be provided between the graphenes 103 and 113, as appropriate. The graphenes 103 are not necessarily provided over the positive electrode current collector 101, and the lithium-containing composite oxides 105 may be in contact with the positive electrode current collector 101.

Figure 5E:
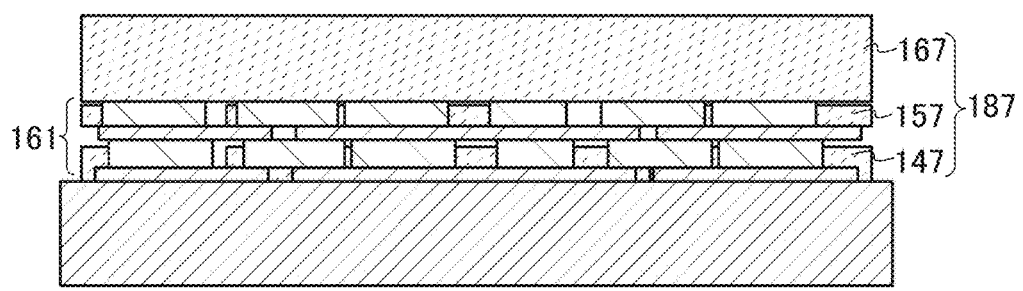

After that, a binder 167 including the solute of the electrolyte of the lithium-ion secondary battery may be provided over the positive electrode active material layer 161 (see FIG. 5E). Through the above steps, the positive electrode active material layer 161 in which gaps are filled with the solid electrolyte can be formed. Note that in FIG. 5E, the binders 147, 157, and 167 each including the solute of the electrolyte of the lithium-ion secondary battery are collectively referred to as a binder 187 including the solute of the electrolyte of the lithium-ion secondary battery.

According to this embodiment, a positive electrode in which a positive electrode active material layer filled with a solid electrolyte is provided over a positive electrode current collector can be formed; thus, the resistance at the interface between the electrode and the electrolyte can be reduced. Accordingly, with the use of the positive electrode described in this embodiment, the internal resistance of a lithium-ion secondary battery is further reduced, the lithium-ion secondary battery can have higher power and can be charged and discharged at high speed, and the discharge capacity can be as high as theoretical discharge capacity.

Embodiment 3

In this embodiment, a lithium-ion secondary battery and a manufacturing method thereof will be described.

A lithium-ion secondary battery according to this embodiment will be described with reference to FIG. 6. Here, a cross-sectional structure of the lithium-ion secondary battery will be described below.

Figure 6:
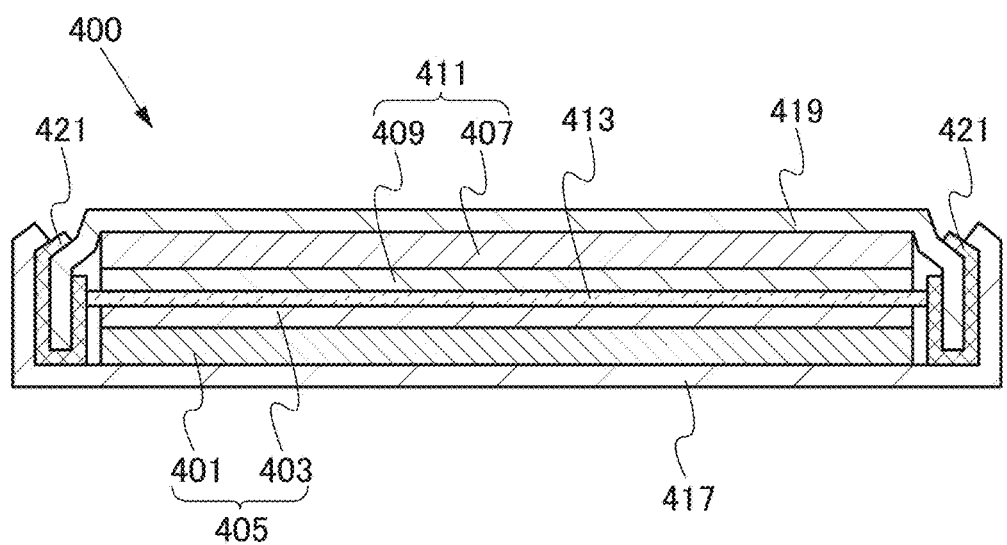
FIG. 6 illustrates a lithium-ion secondary battery.

FIG. 6 is a cross-sectional view of the lithium-ion secondary battery.

A lithium-ion secondary battery 400 includes a negative electrode 411 including a negative electrode current collector 407 and a negative electrode active material layer 409, a positive electrode 405 including a positive electrode current collector 401 and a positive electrode active material layer 403, and a separator 413 provided between the negative electrode 411 and the positive electrode 405. Note that the separator 413 is impregnated with an electrolyte. The negative electrode current collector 407 is connected to an external terminal 419 and the positive electrode current collector 401 is connected to an external terminal 417. An end portion of the external terminal 419 is embedded in a gasket 421. That is to say, the external terminals 417 and 419 are insulated from each other by the gasket 421.

For the negative electrode current collector 407, a material having high conductivity such as copper, stainless steel, iron, or nickel can be used. The negative electrode current collector 407 can have a foil shape, a plate shape, a net shape, or the like as appropriate.

The negative electrode active material layer 409 is formed using a material capable of lithium-ion occlusion and emission. Typically, lithium, aluminum, graphite, silicon, tin, germanium, or the like is used. Note that it is possible to omit the negative electrode current collector 407 and use the negative electrode active material layer 409 alone for a negative electrode. The theoretical lithium occlusion capacity is larger in germanium, silicon, lithium, and aluminum than in graphite. When the occlusion capacity is large, charge and discharge can be performed sufficiently even in a small area and a function of a negative electrode can be obtained, so that reduction in cost and size of a lithium-ion secondary battery can be achieved. However, in the case of silicon or the like, the volume is approximately quadrupled due to lithium occlusion; therefore, the probability that the material itself gets vulnerable should be considered.

Note that the negative electrode active material layer 409 may be predoped with lithium. Predoping with lithium may be performed in such a manner that a lithium layer is formed on a surface of the negative electrode active material layer 409 by a sputtering method. Alternatively, lithium foil is provided on the surface of the negative electrode active material layer 409, whereby the negative electrode active material layer 409 can be predoped with lithium.

The desired thickness of the negative electrode active material layer 409 is determined in the range of 20 µm to 100 µm.

Note that the negative electrode active material layer 409 may include a binder and a conduction auxiliary agent. As the binder and the conduction auxiliary agent, the binder and the conduction auxiliary agent which are included in the positive electrode active material layer described in Embodiment 1 can be used as appropriate.

As the positive electrode current collector 401 and the positive electrode active material layer 403, the positive electrode current collector 101 and the positive electrode active material layer 121 or 141 which are described in Embodiment 1 can be used as appropriate.

As the separator 413, an insulating porous material is used. Typical examples of the separator 413 include cellulose (paper), polyethylene, polypropylene, and the like.

As a solute of the electrolyte, such a material described in Embodiment 2, in which lithium ions, which are carrier ions, can transfer and stably exist, is used as appropriate.

As a solute of the electrolyte, a material in which lithium ions that are carrier ions can transfer and exist stably is used. As the solvent of the electrolyte, a material in which lithium ions can transfer is used. As the solvent of the electrolyte, an aprotic organic solvent is preferably used. Typical examples of aprotic organic solvents include ethylene carbonate, propylene carbonate, dimethyl carbonate, diethyl carbonate, γ-butyrolactone, acetonitrile, dimethoxyethane, tetrahydrofuran, and the like, and one or more of these materials can be used. When a gelled high-molecular material is used as the solvent of the electrolyte, safety against liquid leakage and the like is improved. Further, the lithium ion secondary battery 400 can be thinner and more lightweight. Typical examples of gelled high-molecular materials include a silicon gel, an acrylic gel, an acrylonitrile gel, polyethylene oxide, polypropylene oxide, a fluorine-based polymer, and the like.

As the electrolyte, a solid electrolyte such as $Li_3PO_4$ can be used. Note that in the case of using such a solid electrolyte as the electrolyte, the separator 413 is unnecessary.

Instead of the positive electrode and the electrolyte, a solid electrolyte including a positive electrode active material, which is formed over the positive electrode current collector as described in Embodiment 2, may be used.

For the external terminals 417 and 419, a metal member such as a stainless steel plate or an aluminum plate can be used as appropriate.

Note that in this embodiment, a coin-type lithium-ion secondary battery is given as the lithium-ion secondary battery 400; however, any of lithium-ion secondary batteries with various shapes, such as a sealing-type lithium-ion secondary battery, a cylindrical lithium-ion secondary battery, and a square-type lithium-ion secondary battery, can be used. Further, a structure in which a plurality of positive electrodes, a plurality of negative electrodes, and a plurality of separators are stacked or rolled may be employed.

A lithium-ion secondary battery has a high energy density, a large capacity, and a high output voltage, which enables reduction in size and weight. Further, the lithium-ion secondary battery does not easily deteriorate due to repetitive charge and discharge and can be used for a long time, so that cost can be reduced. When olivine-type lithium-containing composite oxides each of which is a flat single crystal particle whose length in the b-axis direction is shorter than each of the lengths in the a-axis direction and the c-axis direction and graphenes having high conductivity are alternately stacked in the positive electrode active material layer, the lithium-ion secondary battery can have higher discharge capacity and higher power and can be charged and discharged at high speed.

Next, a method for manufacturing the lithium-ion secondary battery 400 according to this embodiment will be described.

First, a method for forming the negative electrode 411 will be described.

The negative electrode active material layer 409 is formed over the negative electrode current collector 407 by a coating method, a sputtering method, an evaporation method, or the like, whereby the negative electrode 411 can be formed. Alternatively, for the negative electrode 411, foil, a plate, or mesh of lithium, aluminum, graphite, or silicon can be used. Here, graphite is predoped with lithium to form the negative electrode.

Next, the method for forming the positive electrode described in Embodiment 1 is employed as appropriate to form the positive electrode 405.

Next, the negative electrode 411, the separator 413, and the positive electrode 405 are impregnated with the electrolyte. Then, the positive electrode 405, the separator 413, the gasket 421, the negative electrode 411, and the external terminal 419 are stacked in this order over the external terminal 417, and the external terminal 417 and the external terminal 419 are crimped to each other with a "coin cell crimper". Thus, the coin-type lithium-ion secondary battery can be manufactured.

Note that a spacer and a washer may be provided between the external terminal 417 and the positive electrode 405 or between the external terminal 419 and the negative electrode 411 so that the connection between the external terminal 417 and the positive electrode 405 or between the external terminal 419 and the negative electrode 411 is enhanced.

Embodiment 4

In this embodiment, an application of the lithium-ion secondary battery described in Embodiment 3 will be described with reference to FIGS. 7A and 7B.

The lithium-ion secondary battery described in Embodiment 3 can be provided in electronic devices, e.g., cameras such as digital cameras or video cameras, digital photo frames, mobile phones (also referred to as cellular phones or cellular phone devices), portable game machines, portable information terminals, audio reproducing devices, and the like. Moreover, the lithium-ion secondary battery can be provided in electrically propelled vehicles such as electric vehicles, hybrid vehicles, electric railway cars, service vehicles, carts, and electric wheelchairs. Here, examples of the electrically propelled vehicles will be described.

Figure 7A:
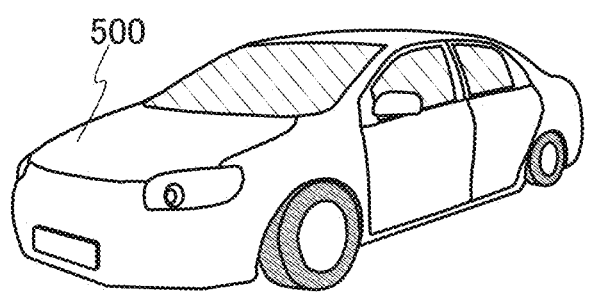
FIGS. 7A and 7B illustrate an application of a lithium-ion secondary battery.
Figure 7B:
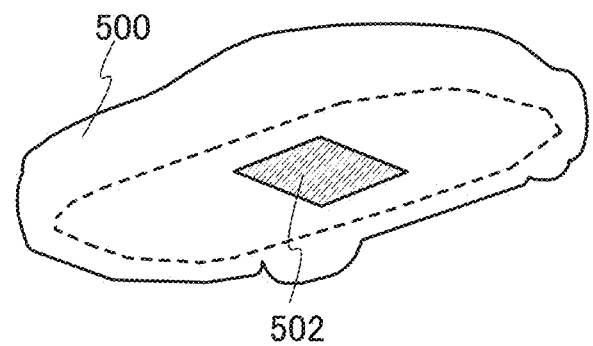

FIG. 7A illustrates a structure of a four-wheeled automobile 500 as an example of the electrically propelled vehicles. The automobile 500 is an electric vehicle or a hybrid vehicle. An example is illustrated in which the automobile 500 is provided with a lithium-ion secondary battery 502 on its bottom portion. In order to clearly show the position of the lithium-ion secondary battery 502 in the automobile 500, FIG. 7B shows the outline of the automobile 500 and the lithium-ion secondary battery 502 provided on the bottom portion of the automobile 500. The lithium-ion secondary battery described in Embodiment 3 can be used as the lithium-ion secondary battery 502. The lithium-ion secondary battery 502 can be charged by being externally supplied with electric power by a plug-in technique or a wireless power feeding system.

Embodiment 5

In this embodiment, examples of using a lithium-ion secondary battery according to one embodiment of the present invention in a wireless power feeding system (hereinafter referred to as an RF power feeding system) will be described with reference to block diagrams in FIG. 8 and FIG. 9. In each of the block diagrams, blocks show elements independently, which are classified according to their functions, within a power receiving device and a power feeding device. However, it is practically difficult to completely separate the elements according to their functions; in some cases, one element can involve a plurality of functions.

First, the RF power feeding system will be described with reference to FIG. 8.

A power receiving device 600 is an electronic device or an electrically propelled vehicle which is driven by electric power supplied from a power feeding device 700, and can be applied to any other devices which are driven by electric power, as appropriate. Typical examples of the electronic device include cameras such as digital cameras or video cameras, digital photo frames, mobile phones, portable game machines, portable information terminals, audio reproducing devices, display devices, computers, and the like. Typical examples of the electrically propelled vehicle include electric vehicles, hybrid vehicles, electric railway cars, service vehicles, carts, electric wheelchairs, and the like. In addition, the power feeding device 700 has a function of supplying electric power to the power receiving device 600.

Figure 8:
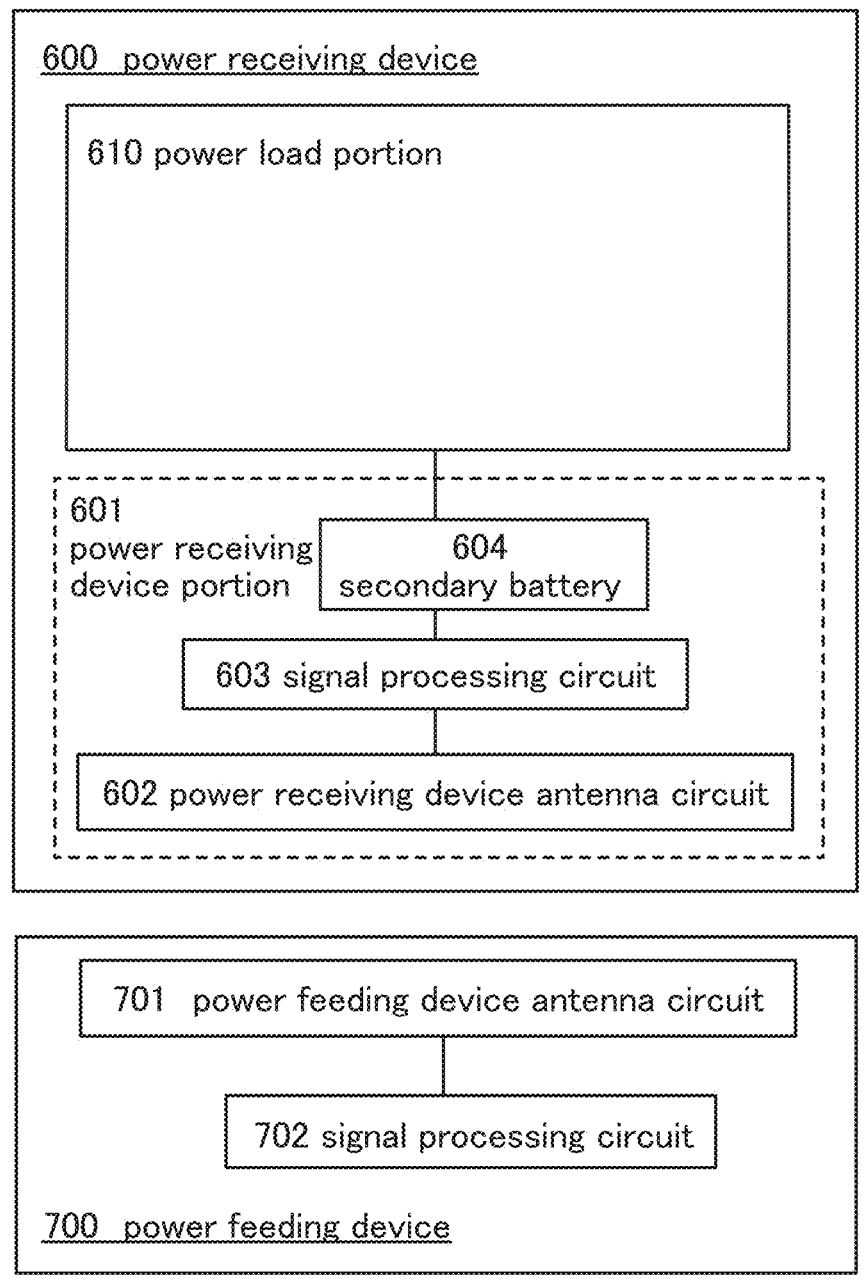
FIG. 8 illustrates an example of a structure of a wireless power feeding system.

In FIG. 8, the power receiving device 600 includes a power receiving device portion 601 and a power load portion 610. The power receiving device portion 601 includes at least a power receiving device antenna circuit 602, a signal processing circuit 603, and a lithium-ion secondary battery 604. The power feeding device 700 includes at least a power feeding device antenna circuit 701 and a signal processing circuit 702.

The power receiving device antenna circuit 602 has a function of receiving a signal transmitted by the power feeding device antenna circuit 701 and a function of transmitting a signal to the power feeding device antenna circuit 701. The signal processing circuit 603 processes a signal received by the power receiving device antenna circuit 602 and controls charging of the lithium-ion secondary battery 604 and supplying of electric power from the lithium-ion secondary battery 604 to the power load portion 610. In addition, the signal processing circuit 603 controls operation of the power receiving device antenna circuit 602. That is, the signal processing circuit 603 can control the intensity, the frequency, or the like of a signal transmitted by the power receiving device antenna circuit 602. The power load portion 610 is a drive portion which receives electric power from the lithium-ion secondary battery 604 and drives the power receiving device 600. Typical examples of the power load portion 610 include a motor, a driver circuit, and the like. Another device which receives electric power and drives the power receiving device may be used as the power load portion 610 as appropriate. The power feeding device antenna circuit 701 has a function of transmitting a signal to the power receiving device antenna circuit 602 and a function of receiving a signal from the power receiving device antenna circuit 602. The signal processing circuit 702 processes a signal received by the power feeding device antenna circuit 701. In addition, the signal processing circuit 702 controls operation of the power feeding device antenna circuit 701. That is, the signal processing circuit 702 can control the intensity, the frequency, or the like of a signal transmitted by the power feeding device antenna circuit 701.

The lithium-ion secondary battery according to one embodiment of the present invention is used as the lithium-ion secondary battery 604 included in the power receiving device 600 in the RF power feeding system shown in FIG. 8.

When the lithium-ion secondary battery according to one embodiment of the present invention is used in the RF power feeding system, the discharge capacity or the charge capacity (also referred to as the amount of power storage) can be increased as compared with the case of using a conventional lithium-ion secondary battery. Therefore, the time interval between wireless power feeding and the next wireless power feeding can be longer (power feeding can be less frequent).

In addition, with the use of the lithium-ion secondary battery according to one embodiment of the present invention in the RF power feeding system, the power receiving device 600 can be compact and lightweight if the discharge capacity or the charge capacity with which the power load portion 610 can be driven is the same as that of a conventional secondary battery. Therefore, the total cost can be reduced.

Next, another example of the RF power feeding system will be described with reference to FIG. 9.

Figure 9:
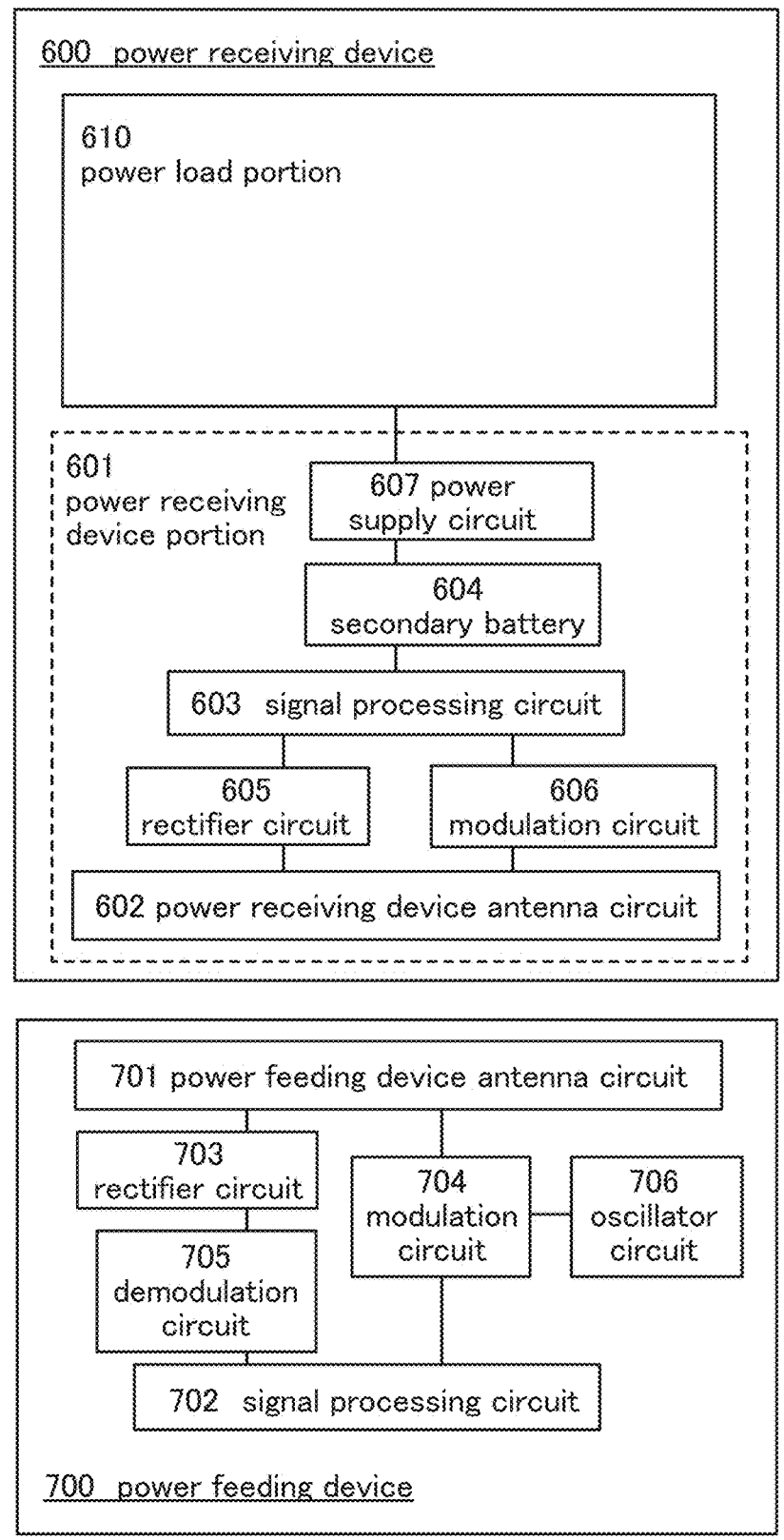
FIG. 9 illustrates an example of a structure of a wireless power feeding system.

In FIG. 9, the power receiving device 600 includes the power receiving device portion 601 and the power load portion 610. The power receiving device portion 601 includes at least the power receiving device antenna circuit 602, the signal processing circuit 603, the lithium-ion secondary battery 604, a rectifier circuit 605, a modulation circuit 606, and a power supply circuit 607. In addition, the power feeding device 700 includes at least the power feeding device antenna circuit 701, the signal processing circuit 702, a rectifier circuit 703, a modulation circuit 704, a demodulation circuit 705, and an oscillator circuit 706.

The power receiving device antenna circuit 602 has a function of receiving a signal transmitted by the power feeding device antenna circuit 701 and a function of transmitting a signal to the power feeding device antenna circuit 701. In the case where the power receiving device antenna circuit 602 receives a signal transmitted by the power feeding device antenna circuit 701, the rectifier circuit 605 generates DC voltage from the signal received by the power receiving device antenna circuit 602. The signal processing circuit 603 has a function of processing a signal received by the power receiving device antenna circuit 602 and a function of controlling charging of the lithium-ion secondary battery 604 and supply of electric power from the lithium-ion secondary battery 604 to the power supply circuit 607. The power supply circuit 607 has a function of converting voltage stored in the lithium-ion secondary battery 604 into voltage needed for the power load portion 610. The modulation circuit 606 is used when a certain response is transmitted from the power receiving device 600 to the power feeding device 700.

With the power supply circuit 607, electric power to be supplied to the power load portion 610 can be controlled. Thus, overvoltage application to the power load portion 610 can be suppressed, leading to suppression of deterioration or breakdown of the power receiving device 600.

In addition, provision of the modulation circuit 606 enables transmission of a signal from the power receiving device 600 to the power feeding device 700. Therefore, when it is judged from the amount of charge of the power receiving device 600 that a certain amount of power is stored, a signal is transmitted from the power receiving device 600 to the power feeding device 700 so that power feeding from the power feeding device 700 to the power receiving device 600 can be stopped. As a result, the lithium-ion secondary battery 604 is not fully charged, so that the number of charge cycles of the lithium-ion secondary battery 604 can be increased.

The power feeding device antenna circuit 701 has a function of transmitting a signal to the power receiving device antenna circuit 602 and a function of receiving a signal from the power receiving device antenna circuit 602. When a signal is transmitted to the power receiving device antenna circuit 602, the signal processing circuit 702 generates a signal to be transmitted to the power receiving device. The oscillator circuit 706 is a circuit which generates a signal with a constant frequency. The modulation circuit 704 has a function of applying voltage to the power feeding device antenna circuit 701 in accordance with the signal generated by the signal processing circuit 702 and the signal with a constant frequency generated by the oscillator circuit 706. Thus, a signal is output from the power feeding device antenna circuit 701. On the other hand, when a signal is received from the power receiving device antenna circuit 602, the rectifier circuit 703 rectifies the received signal. From signals rectified by the rectifier circuit 703, the demodulation circuit 705 extracts a signal transmitted from the power receiving device 600 to the power feeding device 700. The signal processing circuit 702 has a function of analyzing the signal extracted by the demodulation circuit 705.

Note that any circuit may be provided between the circuits as long as the RF power feeding can be performed. For example, after the power receiving device 600 receives a signal and the rectifier circuit 605 generates DC voltage, a circuit such as a DC-DC converter or regulator that is provided in a subsequent stage may generate constant voltage. Thus, overvoltage application to the inside of the power receiving device 600 can be suppressed.

The lithium-ion secondary battery according to one embodiment of the present invention is used as the lithium-ion secondary battery 604 included in the power receiving device 600 in the RF power feeding system shown in FIG. 9.

When the lithium-ion secondary battery according to one embodiment of the present invention is used in the RF power feeding system, the discharge capacity or the charge capacity can be increased as compared with the case of using a conventional secondary battery; therefore, the time interval between wireless power feeding and the next wireless power feeding can be longer (power feeding can be less frequent).

In addition, with the use of the lithium-ion secondary battery according to one embodiment of the present invention in the RF power feeding system, the power receiving device 600 can be compact and lightweight if the discharge capacity or the charge capacity with which the power load portion 610 can be driven is the same as that of a conventional secondary battery. Therefore, the total cost can be reduced.

Note that when the lithium-ion secondary battery according to one embodiment of the present invention is used in the RF power feeding system and the power receiving device antenna circuit 602 and the lithium-ion secondary battery 604 overlap with each other, it is preferred that the impedance of the power receiving device antenna circuit 602 is not changed because of deformation of the lithium-ion secondary battery 604 due to charge and discharge of the lithium-ion secondary battery 604 and deformation of an antenna due to the above deformation. If the impedance of the antenna is changed, in some cases, electric power is not supplied sufficiently. For example, the lithium-ion secondary battery 604 may be packed in a battery pack formed of metal or ceramics. Note that in that case, the power receiving device antenna circuit 602 and the battery pack are preferably separated from each other by several tens of micrometers or more.

In this embodiment, the signal for charge has no limitation on its frequency and may have any band of frequency with which electric power can be transmitted. For example, the signal for charge may have any of an LF band of 135 kHz (long wave), an HF band of 13.56 MHz (short wave), a UHF band of 900 MHz to 1 GHz (ultra high frequency wave), and a microwave band of 2.45 GHz.

A signal transmission method may be properly selected from various methods including an electromagnetic coupling method, an electromagnetic induction method, a resonance method, and a microwave method. In order to prevent energy loss due to foreign substances containing moisture, such as rain and mud, an electromagnetic induction method or a resonance method using a low frequency band, specifically, frequencies of short waves of 3 MHz to 30 MHz, frequencies of medium waves of 300 kHz to 3 MHz, frequencies of long waves of 30 kHz to 300 kHz, or frequencies of ultra long waves of 3 kHz to 30 kHz, is preferably used.

This embodiment can be implemented in combination with any of the above embodiments.

REFERENCE NUMERALS

101: positive electrode current collector, 103: graphene, 105: lithium-containing composite oxide, 105a: lithium-containing composite oxide, 107: binder, 108: gap, 109: slurry, 113: graphene, 115: lithium-containing composite oxide, 117: binder, 118: gap, 121: positive electrode active material layer, 123: graphene, 125: lithium-containing composite oxide, 127: binder, 133: graphene, 135: lithium-containing composite oxide, 141: positive electrode active material layer, 147: binder, 149: slurry, 157: binder, 161: positive electrode active material layer, 167: binder, 187: binder, 301: unit cell, 303: lithium, 305: iron, 307: phosphorus, 309: oxygen, 400: lithium-ion secondary battery, 401: positive electrode current collector, 403: positive electrode active material layer, 405: positive electrode, 407: negative electrode current collector, 409: negative electrode active material layer, 411: negative electrode, 413: separator, 417: external terminal, 419: external terminal, 421: gasket, 500: automobile, 502: lithium-ion secondary battery, 600: power receiving device, 601: power receiving device portion, 602: power receiving device antenna circuit, 603: signal processing circuit, 604: lithium-ion secondary battery, 605: rectifier circuit, 606: modulation circuit, 607: power supply circuit, 610: power load portion, 700: power feeding device, 701: power feeding device antenna circuit, 702: signal processing circuit, 703: rectifier circuit, 704: modulation circuit, 705: demodulation circuit, and 706: oscillator circuit.

This application is based on Japanese Patent Application serial no. 2011-068599 filed with the Japan Patent Office on Mar. 25, 2011, the entire contents of which are hereby incorporated by reference.

What is claimed is:

1. An electrode comprising:
a current collector;
a first layer comprising a first film of a graphene, a second film of a graphene, and a gap between the first film and the second film, each of the first film and the second film over and in contact with the current collector;
a first active material particle over the first layer, the first active material particle including a first portion and a second portion; and
a third film of a graphene over the first active material particle,
wherein the first active material particle and each of the first film, the gap and the second film overlap each other,
wherein the first portion of the first active material particle overlaps with the first film while the second portion of the first active material particle does not overlap with the first film, and
wherein the first active material particle comprises an olivine-type lithium-containing composite oxide, and
wherein the olivine-type lithium-containing composite oxide is expressed by a general formula $LiMPO_4$, where M is one or more of Fe(II), Mn(II), Co(II), and Ni(II).

2. The electrode according to claim 1, wherein the first active material particle is in direct contact with the first film and the third film.

3. The electrode according to claim 1, further comprising a second active material particle over the first active material particle.

4. The electrode according to claim 1, wherein each of the first film, the second film and the third film is formed by a process comprising a step of reducing a graphene oxide.

5. A lithium-ion secondary battery comprising:
the electrode according to claim 1;
a negative electrode; and
an electrolyte between the electrode and the negative electrode,
wherein the electrolyte includes solid electrolyte.

* * * * *